United States Patent [19]
Jones et al.

[11] Patent Number: 4,527,334
[45] Date of Patent: Jul. 9, 1985

[54] POWER RETURN TAPE

[75] Inventors: Herman S. Jones, Wendell; William C. Blackman, Raleigh, both of N.C.

[73] Assignee: Cooper Industries, Inc., Houston, Tex.

[21] Appl. No.: 537,518

[22] Filed: Sep. 30, 1983

[51] Int. Cl.³ .............................................. G01B 3/10
[52] U.S. Cl. ...................................... 33/138; 242/107
[58] Field of Search ................. 33/138; 242/84.8, 107, 242/107.3

[56] References Cited

U.S. PATENT DOCUMENTS

| 889,570 | 6/1908 | Ayers | 33/138 |
|---|---|---|---|
| 913,703 | 3/1909 | Darter | 33/138 |
| 1,245,704 | 11/1917 | Gowrie | 33/138 |
| 1,945,842 | 2/1934 | Witchger | 33/138 |
| 2,129,582 | 9/1938 | Johansson | 33/138 |
| 2,709,393 | 5/1955 | Anderson | 33/138 |

FOREIGN PATENT DOCUMENTS

| 685622 | 5/1964 | Canada | 242/84.8 |
|---|---|---|---|
| 1012463 | 7/1957 | Fed. Rep. of Germany | 33/138 |
| 2405461 | 6/1979 | France | 33/138 |

Primary Examiner—Richard R. Stearns
Attorney, Agent, or Firm—Wigman & Cohen

[57] ABSTRACT

A measuring device comprises an outer casing and an inner drum mounted on a central hub of the casing. The drum has an innermost rim, an intermediate rim, and an outermost rim, each of the rims having a different diameter. The intermediate and innermost rims are arranged on one side of the drum while the outer rim is arranged on an opposite side of the drum. A tape is wound onto the intermediate rim on one side of the drum while a spring is wound inside the outer rim on the other side of the drum. This side-by-side arrangement of the tape and spring allows a lengthy tape, for example, 50 feet or more, to be quickly returned, compactly stored, and easily carried. A resilient shock-absorbing bumper is also provided around the periphery of the outer casing.

10 Claims, 4 Drawing Figures

POWER RETURN TAPE

BACKGROUND OF THE INVENTION

The present invention relates to an apparatus for measuring linear distances, and more particularly to a measuring tape having a spring-powered return mechanism.

Measuring tapes having spring-powered return mechanisms are well-known in the art. In such devices the tape is wound around the outside of a rotatable drum or reel mounted within a casing. A coil spring made of flat strip steel or other suitable material is disposed inside the drum. The coil spring becomes stress-wound as the tape is withdrawn from the casing and imparts its stored energy to rotate the drum when it is desired to retract the tape into the casing. The measuring tapes shown in U.S. Pat. Nos. 3,578,259; 3,521,831; 3,519,220; 3,519,219; 3,499,612 and 3,415,461, are exemplary of such prior art devices.

For relatively short tapes of 25 feet or less, the above-described prior art devices are effective and easily used. However, for tapes of greater length, particularly those in excess of 50 or 100 feet, the concentric arrangement of tape and coil spring necessitates a relatively large and bulky device that is difficult to handle and use. Consequently, measuring tapes of such length are usually not provided with spring-powered return mechanisms, but rather utilize a simple hand crank for rewinding the tape. Inasmuch as space for the coil spring is not required in such devices, the rotatable drum or reel upon which the tape is wound may be relatively small in diameter, thus minimizing the size of the device. However, because the diameter of the drum is, by design, relatively small, each turn of the crank retracts only a short length of tape, particularly in the initial stages of the rewinding operation. Thus, rewinding such long tapes by hand is a slow and tedious procedure.

SUMMARY AND OBJECTS OF THE INVENTION

In view of the foregoing limitations and shortcomings of the prior art devices, as well as other disadvantages not specifically mentioned above, it should be apparent that there still exists a need in the art for an efficient and convenient method of rewinding long measuring tapes. It is, therefore, a primary object of this invention to provide a compact measuring device having a relatively long tape that may be automatically retracted into its casing.

More particularly, it is an object of this invention to provide such a measuring device with a spring-powered return mechanism that is nevertheless compact and easy to handle and use.

Another object of this invention is to provide a compact measuring device having a relatively long tape wound on a rotatable drum that is powered by a coil spring.

A further object of this invention is to provide a measuring device having a power return spring for rapidly rewinding a tape of 50 feet or more.

Yet another object of this invention is to provide such a measuring device with an outer casing wherein there is a shock-absorbing bumper around the periphery of the casing so that the device will not become scratched or broken if dropped by the user.

Briefly described, the foregoing objects are accomplished in accordance with this invention by mounting the tape and the coil spring in a compact side-by-side arrangement in the casing rather than concentrically as in the prior art. A novel drum is provided having annular rims integrally formed with and disposed on opposite sides of a central disc or plate. The tape is wound about the periphery of one of the rims while the coil spring is mounted within the other rim. Because the spring is not disposed within the rim upon which the tape is wound, the diameter of that rim may be decreased so as to provide a more compact arrangement. Although the thickness of the casing is, of necessity, greater than that of prior art devices, it is overall less bulky and easier to handle than would be the case if the tape and spring were wound concentrically.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF THE PREFERRED EMBODIMENT

Figure 1:
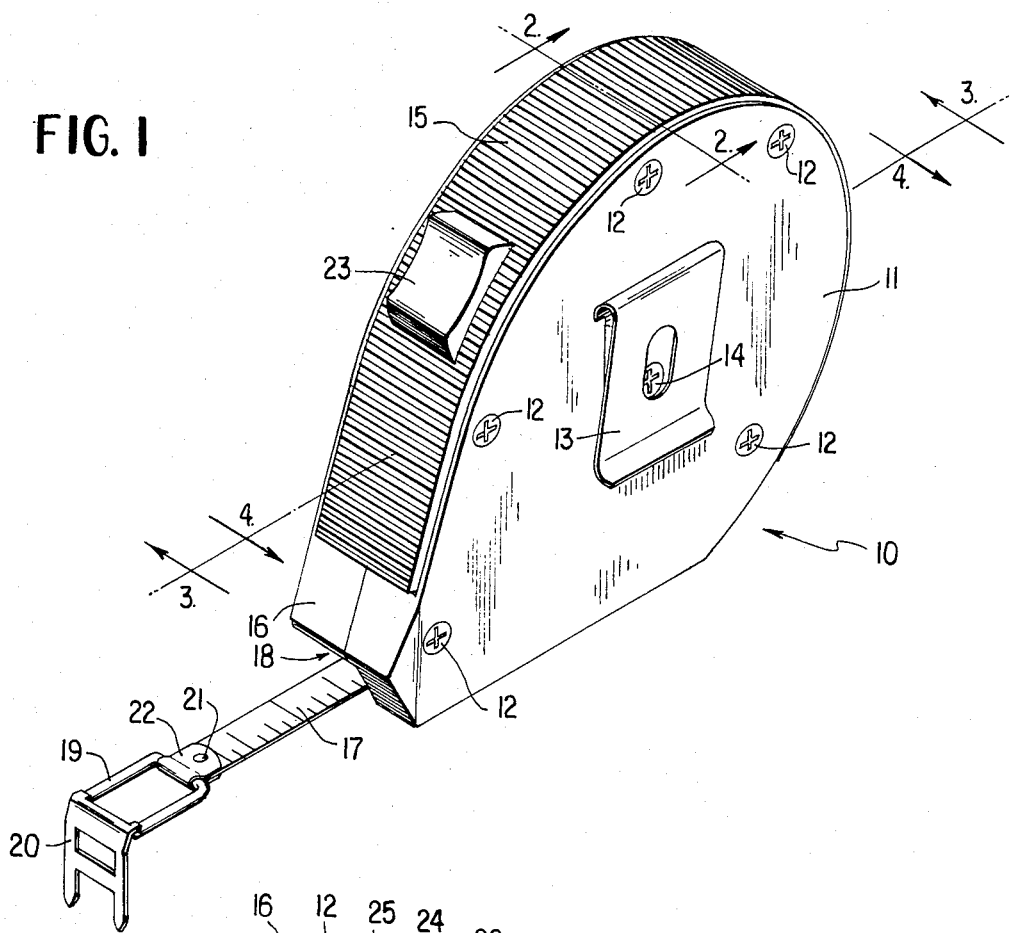
FIG. 1 is a perspective view of the measuring device of the present invention, showing the measuring tape slightly extended therefrom.

Referring now to the drawings in detail wherein like parts are designated by like reference numerals throughout, there is shown in FIG. 1 the measuring device of the present invention generally designated by the numeral 10. The measuring device 10 includes an outer casing 11 comprised of two casing halves connected together by five casing screws 12. A clip 13 is attached to one half of the outer casing 11 by a screw 14 for the purpose of allowing a user to carry the measuring device 10 hooked onto a belt or some other object. A resilient shock-absorbing bumper 15, preferably made of rubber or soft polyvinylchloride (PVC), is secured by adhesive or other suitable means to the peripheral wall 16 of the casing 11.

The leading end of a measuring tape 17 is shown slightly extended from an opening 18 in the peripheral wall 16 of the casing 11. Preferably, the tape 17 is ⅜ inch wide, 0.005 inch thick, and 50 feet long, and is made of flat strip steel which is painted, printed, and coated with a clear protective material. A rectangular ring 19 is attached at one end to a hook 20 and is attached by a rivet 21 at its other end to a clip 22 which secures the ring 19 to the leading end of the tape 17. A lock button 23 is mounted in the peripheral wall 16 of the casing 11.

Figure 2:
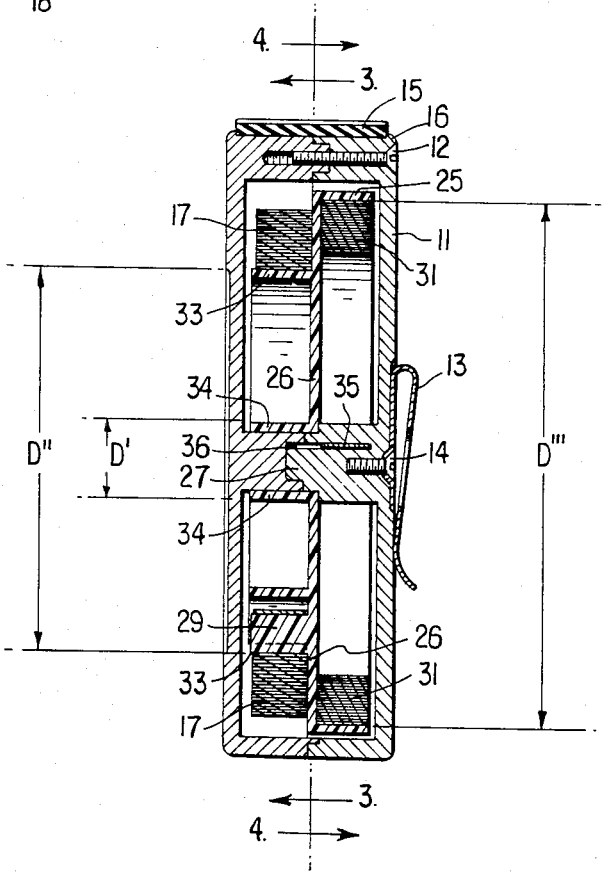
FIG. 2 is a transverse cross-sectional view taken along line 2—2 of FIG. 1 and illustrates details of the assembled outer casing, inner drum, wound measuring tape, and coiled spring of the measuring device.

Referring now to FIG. 2, there is shown in cross-section an inner drum 26 which comprises three concentric rims 34, 33, and 25 of different diameters D', D", and D''' extending from a flat central disc (extending vertically in FIG. 2). The outermost rim 25 extends from one side of the disc at the outermost periphery of the disc and the two smaller concentric rims 33 and 34 extend from the other side of the disc. The entire drum 26 is rotatably mounted on a central hub 27 by the innermost rim 34. The hub 27 is integrally and rigidly connected to the casing 11. The drum may be made of a plastic material, such as nylon.

The measuring tape 17 is wrapped in a coil around the outside of the intermediate rim 33. A pre-stressed power-return spring 31 is wrapped in a coil on the inside of the outermost rim 25. Thus, the tape 17 and the power-return spring are mounted in a side-by-side arrangement instead of being concentrically coiled one inside the other. The side-by-side arrangement allows the tape and return spring to be stored in a casing with a radius much smaller than required by the prior art.

Figure 3:
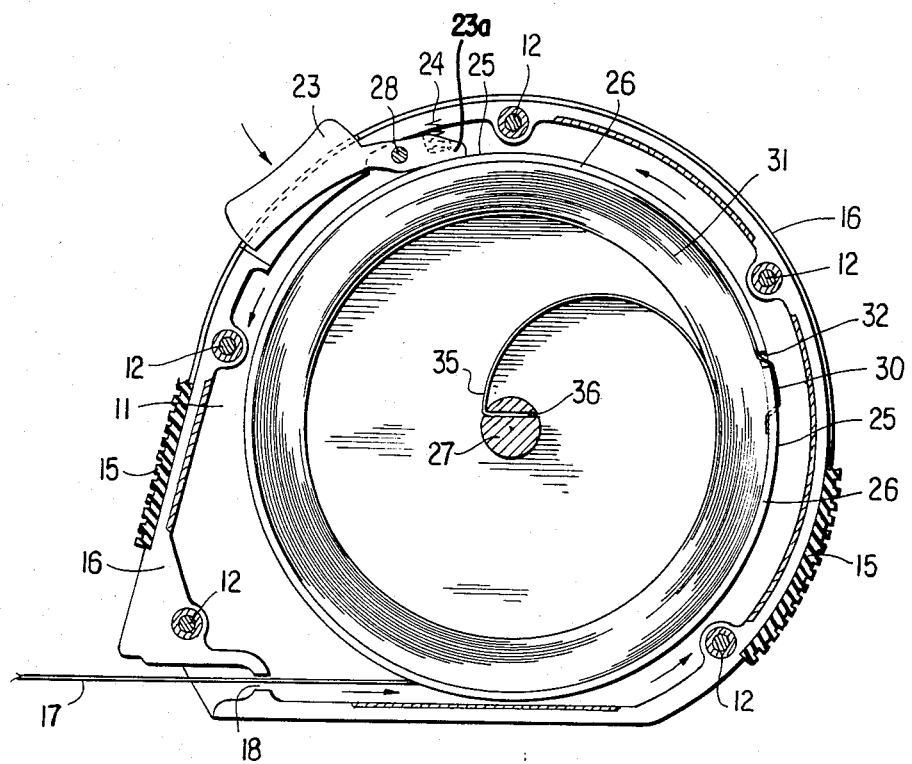
FIG. 3 is a longitudinal cross-sectional view of the measuring device taken along line 3—3 of FIGS. 1 and 2 and illustrates the power return spring coiled inside the outer rim on one side of the rotating drum arrangement.

As shown in FIG. 3, the return spring 31 is coiled within the outermost rim 25 of the drum 26. One end 30 of the return spring 31 is secured in an opening 32 cut into the outermost peripheral rim 25 of the drum 26. The other end 35 of the return spring 31 is secured in a slot 36 cut into the fixed central hub 27 on which drum 26 rotates.

Figure 4:
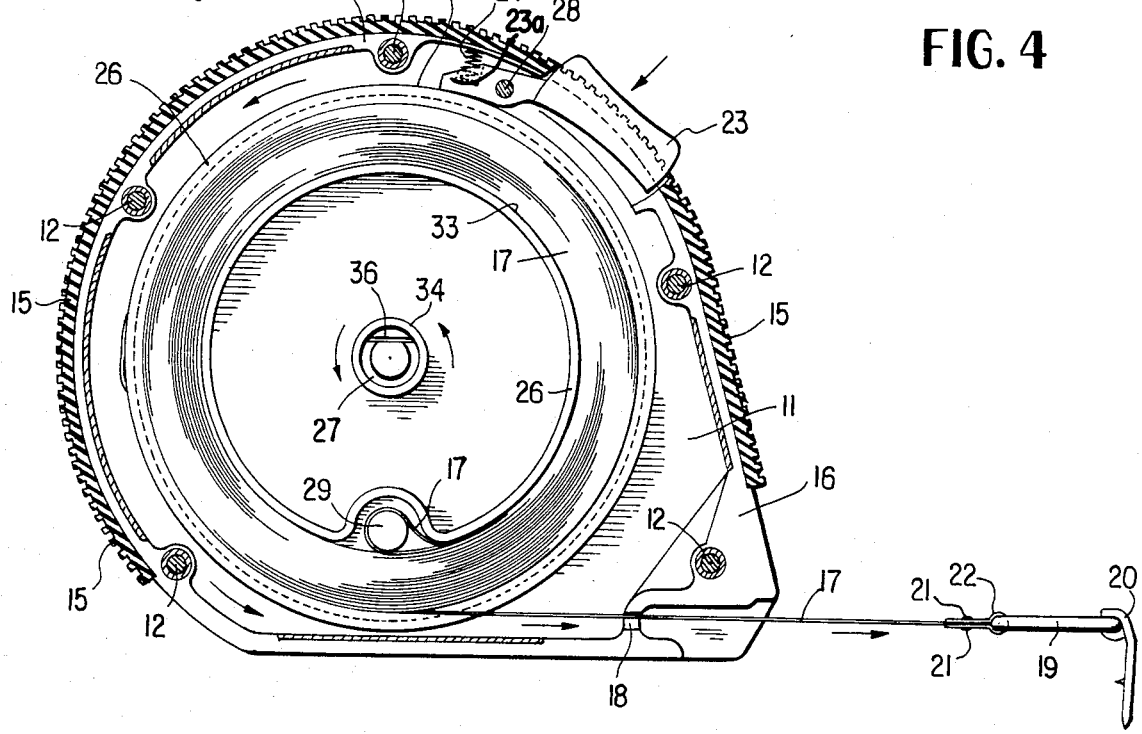
FIG. 4 is a longitudinal cross-sectional view of the measuring device taken along line 4—4 of FIGS. 1 and 2 and illustrates the measuring tape wrapped around an intermediate rim on the other side of the rotating drum arrangement.

In FIG. 4, the tape 17 is shown wrapped around the intermediate rim 33 of the drum 26. The innermost end of the tape 17 is secured to a stud 29 integrally formed on the flat central disc of the drum 26. The other end of the tape 17 extends through the opening 18 in the peripheral wall 16 of the casing 11 and, as described earlier, is riveted to a rectangular ring 19 and hook 20. Also shown in FIG. 4 is the innermost rim 34 in position over the hub 27.

Tape 17 is wrapped around the intermediate peripheral rim 33 of the drum 26 instead of the inner rim 34 because the diameter D" of rim 33 is larger than the diameter D' of the inner rim 34. The advantage of arranging the tape 17 on the rim with the larger diameter is that it is possible for the tape 17 to be retracted more rapidly because a greater length of tape 17 is retracted for every revolution of the drum 26.

As seen in FIGS. 3 and 4, the lock button 23 has a locking finger 23a which is biased by a small coil spring 24 into frictional contact with the outermost peripheral rim 25 of the drum 26. The spring 24 is attached at one end to the locking finger 23a and at the other end thereof to the inside wall of the casing 11. The lock button 23 is pivoted about a pin 28 and provides a positive locking arrangement, known as a "dead man's lock," with the drum 26. When the user releases the lock button 23, the small coil spring 24 will force the locking finger 23a into frictional engagement with the outer peripheral rim 25 of drum 26, thus preventing movement of the tape 17.

The operation of the measuring device 10 is as follows. Referring to FIG. 4, to pull the tape 17 out of the opening 18 in the peripheral wall 16 of the casing 11, the user depresses lock button 23, and at the same time grips ring 19 or hook 20 and pulls manually on the leading end of the tape 17. Lock button 23 pivots about pin 28, compressing the small coil spring 24 and swinging the locking finger 23a out of frictional contact with the outermost peripheral rim 25 of the drum 26. When the locking finger 23a is out of frictional contact with the outermost peripheral rim 25 of the drum 26, tape 17 may be pulled freely out of the opening 18. As the tape 17 is pulled from one side of the drum 26, the return spring 31 is wound around the central hub 27 on the other side of the drum 26, thus storing energy in the spring 31 for later rewinding the tape 17. In order to lock tape 17 in any desired position, the user simply releases the lock button 23.

When the tape 17 is completely extended, the return spring 31 will be wound tightly around the central hub 27 with a maximum amount of tension. In order to retract the tape 17 into the casing through the opening 18 in the peripheral wall 16 of the casing 11, the lock button 23 is depressed so that the coil spring 24 is compressed, thus bringing the locking finger 23a out of frictional contact with the outer peripheral rim 25 of the drum 26. The stressed return spring 31 then will release its stored energy by unwinding from its tightly wound configuration around central hub 27 to a loosely wound configuration against the inside wall of the outermost peripheral rim 25 of the drum as shown in FIG. 3.

Because the stressed return spring 31 is attached at one end 30 in the opening 32 in the outer peripheral rim 25 and at the other end 35 in the slot 36 of the fixed central hub 27, the drum 26 will rotate with the spring 31 while the spring 31 is uncoiling from its tightly wound to its loosely wound configuration. As the drum 26 rotates with the spring 31, which is uncoiling on one side of the drum 26, the tape 17 is being rewound onto the outside wall of the intermediate peripheral rim 33 on the other side of the drum 26. As can be seen from FIG. 3, the central hub 27 will not rotate because it is part of the outer casing 11, but the drum 26 is rotated counter-clockwise as the spring 31 uncoils inside the drum 26.

The rewinding of the tape 17 may be interrupted at any time simply by releasing the lock button 23 so that the coil spring 24 will expand and force the locking finger 23a into frictional contact with the outermost peripheral rim 25 of the drum 26.

Although only preferred embodiments are specifically illustrated and described herein, it will be appreciated that many modifications and variations of the present invention are possible in light of the above teachings and within the purview of the appended claims without departing from the spirit and intended scope of the invention.

We claim:

1. A measuring device, comprising:
   a casing having a central hub and an opening therein;
   a drum mounted in the casing on the central hub, said drum comprising a flat central disc, the plane of said disc being normal to the axis of said drum, said disc having an innermost rim, an intermediate rim, and an outermost rim, each of the rims being concentrically mounted on said disc, said intermediate and innermost rims being arranged on one side of said disc and said outermost rim being arranged on an opposite side of said disc;
   a tape having a free end extending through the opening in the casing and having its other end attached at the intermediate rim of the drum, said tape being wound onto the intermediate rim; and
   a return spring having one end secured to the central hub of the casing and having its other end secured to the outermost rim of the drum, said return spring being wound inside the outermost rim.

2. The measuring device according to claim 1, wherein the tape and the return spring are mounted in side-by-side relationship on opposite sides of said disc.

3. The measuring device of claim 1, wherein:
the drum is mounted on the central hub at the innermost rim.

4. The measuring device of claim 1, wherein the rims are mounted on the disc at different diameters.

5. A measuring device including a casing having a central hub, a drum having a plurality of rims mounted on the hub, a tape being wound onto one of said rims, and a return spring being wound inside another of said rims, said tape being mounted on one side of the drum, and said spring being mounted on an opposite side of the drum.

6. The measuring device according to claim 5, wherein said drum comprises a disc, the tape and the return spring and their associated rims being mounted in side-by-side relationship on opposite sides of the disc.

7. A measuring device comprising a casing, a drum mounted within the casing, a return spring mounted on said drum and a tape mounted on said drum in side-by-side relationship with the return spring, said drum comprising a flat central disc and a plurality of rims concentrically mounted on said disc.

8. The measuring device according to claim 7, wherein the tape is mounted on a first one of said rims extending from one side of said disc and the return spring is mounted within a second one of said rims extending from the opposite side of said disc.

9. The measuring device according to claim 8, wherein said casing includes a central hub, a third one of said rims extending from said one side of said disc, said third rim being rotatably mounted on said central hub.

10. The measuring device according to claim 9, wherein the diameter of said second rim is greater than the diameter of said first and third rims and the diameter of said first rim is greater than the diameter of said third rim.

* * * * *